US006636348B2

United States Patent
Noguchi (10) Patent No.: US 6,636,348 B2
(45) Date of Patent: Oct. 21, 2003

(54) SIGNAL BREAK DETECTING CIRCUIT (75) Inventor: Hidemi Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/962,113

(22) Filed: Sep. 26, 2001

(65) Prior Publication Data

US 2002/0036810 A1 Mar. 28, 2002

(30) Foreign Application Priority Data

Sep. 27, 2000 (JP) ........................................ 2000-293232

(51) Int. Cl.⁷ ................................................. H01S 3/00
(52) U.S. Cl. .............................. 359/344.41; 356/73.1; 250/227.14
(58) Field of Search ................... 359/344.41; 356/73.1; 250/227.14

(56) References Cited

U.S. PATENT DOCUMENTS

| 5,530,712 A | * | 6/1996 | Solina et al. ................. 372/31 |
| 5,543,783 A | * | 8/1996 | Clark et al. ................. 340/550 |
| 6,038,062 A | * | 3/2000 | Kosaka ........................ 359/341 |
| 6,064,501 A | * | 5/2000 | Roberts et al. ............. 359/341 |
| 6,222,668 B1 | * | 4/2001 | Dutrisac et al. ............ 359/337 |
| 6,259,517 B1 | * | 7/2001 | Tedesco et al. ............ 356/73.1 |
| 6,310,718 B1 | * | 10/2001 | Saeki ...................... 359/341.2 |

FOREIGN PATENT DOCUMENTS

| EP | 1193902 | * | 4/2002 |
| JP | 62284519 | * | 12/1987 |
| JP | 3-79141 | | 4/1991 |
| JP | 5114842 | * | 5/1993 |
| JP | 5-260032 | | 10/1993 |
| JP | 3045069 | | 3/2000 |

* cited by examiner

Primary Examiner—Nelson Moskowitz
(74) Attorney, Agent, or Firm—McGinn & Gibb, PLLC

(57) ABSTRACT

This invention provides a signal break detecting circuit for reducing time required for detecting a data signal break. A difference between an average value of data signal amplified by a limiter amplifier (2) to a predetermined amplitude (output of a full-wave rectifying circuit (7)) and a peak value (output of a peak value detecting circuit (5)) is compared with a reference voltage Vth by a comparator (9) and if the difference drops below the reference voltage Vth, an alarm is dispatched. Consequently, as compared to a conventional technology in which the data signal break is detected by detecting that the peak value of the reception signal drops to a predetermined value, time required for detecting a data signal break can be reduced.

22 Claims, 8 Drawing Sheets

SIGNAL BREAK DETECTING CIRCUIT

FIELD OF THE INVENTION

The present invention relates to a signal break detecting circuit and particularly to a signal break detecting circuit for detecting a signal break in optical signals received by an optical receiving unit.

BACKGROUND OF THE INVENTION

If a break occurs in optical signals received by an optical receiving unit or a fiber is disconnected or in case of wave length division multiplex (WDM), an optical fiber amplifier (OFA) gets in trouble, such a transmission path failure is detected and alarm (loss of signal) is dispatched. This function is an indispensable function specified according to international telecommunications union (ITU) for distinguishing such transmission path failure from unit failure.

When this alarm is dispatched, the optical receiving unit confirms operation of a mating unit and gets into a sequence for switching the transmission path to a reserved system (These are specified according to TMN of ITU-T and controlled by network control system of each unit). If all failures are vanished, the network control system confirms with the mating unit and switches back from the reserved system to its current system.

Because basically, the alarm acts as a trigger for executing automatic switching with the mating unit (mating units between different companies are considered), certainty and dispatch time are considered important. Although the alarm dispatch time is not specified according to ITU especially, the alarm is requested to be dispatched in 2.3 $\mu$s~100 $\mu$s according to the specification of Bellcore. That is, considering switch-over with cross connection or same sign continuity (for example, for distinguishing whether data having continuous "0" level is received or the "0" level is attained due to signal break), it is requested that respective rates of synchronous optical network (SONET) do not dispatch any alarm within 2.3 $\mu$s since data signal break.

On the other hand, the data signal break in a conventional optical receiving unit is detected by detecting that a peak value of reception signal drops to a predetermined value. Further, technology for detecting the signal break using timing signal extracted from the reception signal has been disclosed in each of Japanese Patent Application Laid-Open No. 5-260032 (hereinafter referred to preceding technical document 1), Japanese Patent Application Laid-Open No. 3-79141 (hereinafter referred to as preceding technical document 2) and Japanese Patent No. 3045069 (hereinafter referred to as preceding technical document 3).

However, the conventional optical receiving unit has such a disadvantage that it takes a long time until data signal break is detected since that break occurs, because it detects that the peak value of the reception signal drops to a predetermined value. On the other hand, any means which solves this disadvantage has not been disclosed in the preceding technical documents 1–3.

SUMMARY OF THE INVENTION

Accordingly, an object of the present invention is to provide a signal break detecting circuit capable of reducing time necessary for detecting a data signal break as compared to the conventional detecting circuit.

To achieve the above object, the present invention provides a signal break detecting circuit for detecting a signal break in reception signal, comprising: a first value detecting means for detecting a first value obtained corresponding to the amplitude of the reception signal; a second value detecting means for detecting a second value which is obtained corresponding to the amplitude of the reception signal and different from the first value; a difference detecting means for detecting a difference between the first value and the second value; and a comparing means which compares output of the difference detecting means with a predetermined reference value and outputs a comparison result.

According to the present invention, by comparing a difference between the first value and the second value obtained corresponding to the amplitude of the reception signal, signal break is detected. Consequently, time necessary for detecting the data signal break can be reduced, as compared to the conventional detecting circuit.

The present invention achieves a signal break detecting circuit for detecting a signal break in reception signal, comprising: a first value detecting means for detecting a first value obtained corresponding to the amplitude of the reception signal; a second value detecting means for detecting a second value which is obtained corresponding to the amplitude of the reception signal and different from the first value; a difference detecting means for detecting a difference between the first value and the second value; and a comparing means which compares output of the difference detecting means with a predetermined reference value and outputs a comparison result. Consequently, time necessary for detecting data signal break can be reduced.

DESCRIPTION OF THE PREFERRED EMBODIMENTS

First, the outline of the present invention will be described. The feature of the present invention is that when an optical signal is transformed to an electric signal, a difference between an average value of data signal amplified to a predetermined amplitude by an automatic gain control (AGC) amplifier, limiter amplifier or the like and a peak value is monitored so as to detect a signal level and if the signal level drops below a predetermined level, an alarm is dispatched in a short time.

According to the present invention, by optimizing time constant of an average value detecting circuit without depending on an inputted time constant of AC coupling (for example, coupling capacitor) or a time constant of a DC feedback circuit (DCFB), the dispatch time (response time) of alarmcanbe reduced more than conventionally.

Further, by monitoring a difference between an average value of inputted signal waveform and a peak value full-wave rectified, a signal level break can be detected without depending on offset of the input signal in a short time. This is valid if there is an offset in a limiter amplifier (LIM). Additionally, this is also valid in case where an offset is given to the limiter amplifier intentionally for adaptive threshold control (ATC) so as to optimize a threshold value, Further, due to the full-wave rectification, there is an effect that alarm can be dispatched irrespective of which level just before data signal breaks is positive or negative, power consumption can be reduced because such a high-speed circuit as flip-flop and logic IC is not necessary.

Figure 1:
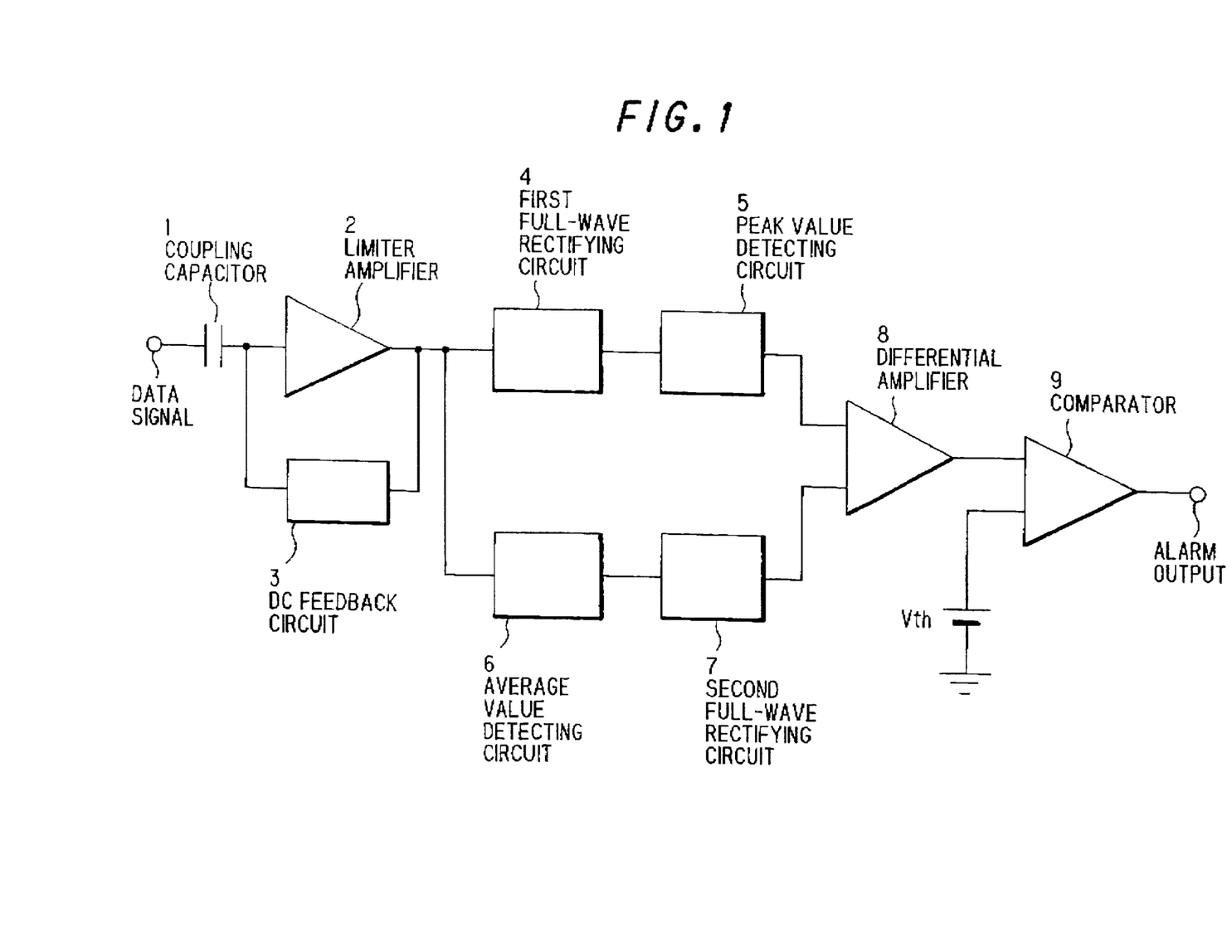
FIG. 1 is a structure diagram of a first embodiment of an optical receiving unit including a signal break detecting circuit according to the present invention.

Hereinafter, the embodiments of the present invention will be described in detail with reference to the accompanying drawings. FIG. 1 is a structure diagram of the first embodiment of an optical receiving unit including a signal break detecting circuit according to the present invention. Referring to the same Figure, the optical receiving unit comprises a coupling capacitor 1 for removing DC component of data signal which is transformed from optical signal to electric signal, a limiter amplifier (LIM) 2 for inputting data signal through the coupling capacitor 1, a DC feedback circuit (DCFB) 3 for providing offset voltage to data signal inputted to the limiter amplifier 2 and a signal break detecting circuit.

The signal break detecting circuit comprises a first full-wave rectifying circuit 4 for full-wave rectifying output of the limiter amplifier 2, a peak value detecting circuit (peak DET) 5 for detecting a peak value in the first full-wave rectifying circuit 4, an average value detecting circuit (Ave DET) 6 for detecting an average value of output of the limiter amplifier 2, a second full-wave rectifying circuit 7 for full-wave rectifying output of the average value detecting circuit 6, a differential amplifier (Diff Amp) 9 for amplifying a difference between output of the peak value detecting circuit 5 and output of the second full-wave rectifying circuit 7 and a comparator (Comp) 9 for dispatching alarm output if output of the differential amplifier 8 drops below a reference voltage Vth.

The limiter amplifier 2 may be of other means like AGC amplifier as long as it amplifies data signal which is transformed from optical signal to electric signal to a predetermined amplitude. Further, the comparator 9 may be provided with hysteresis characteristic to suppress deflection in the vicinity of the reference voltage Vth.

Figure 2:
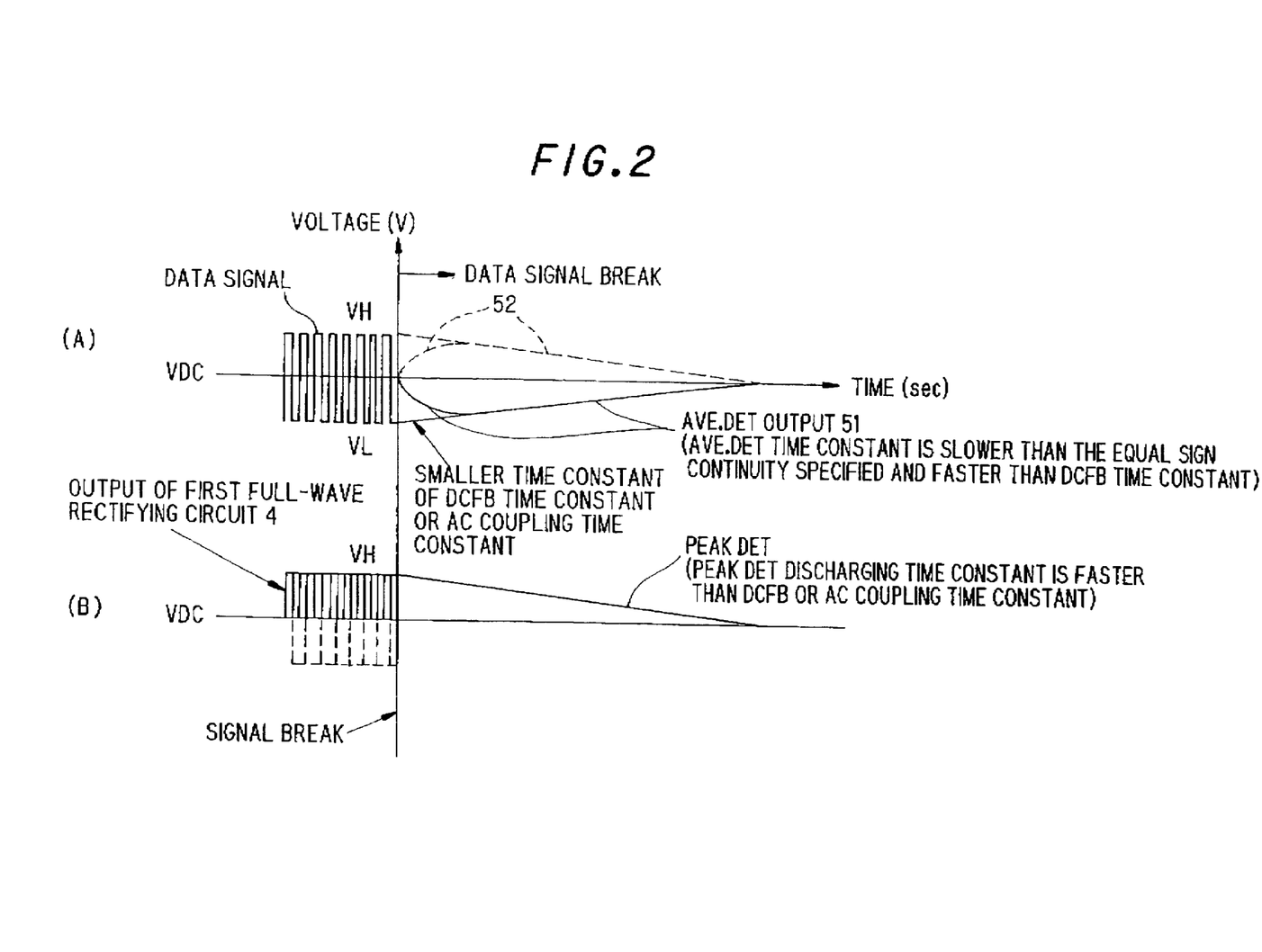
FIG. 2 is a timing chart showing an operation of the first embodiment.
Figure 3:
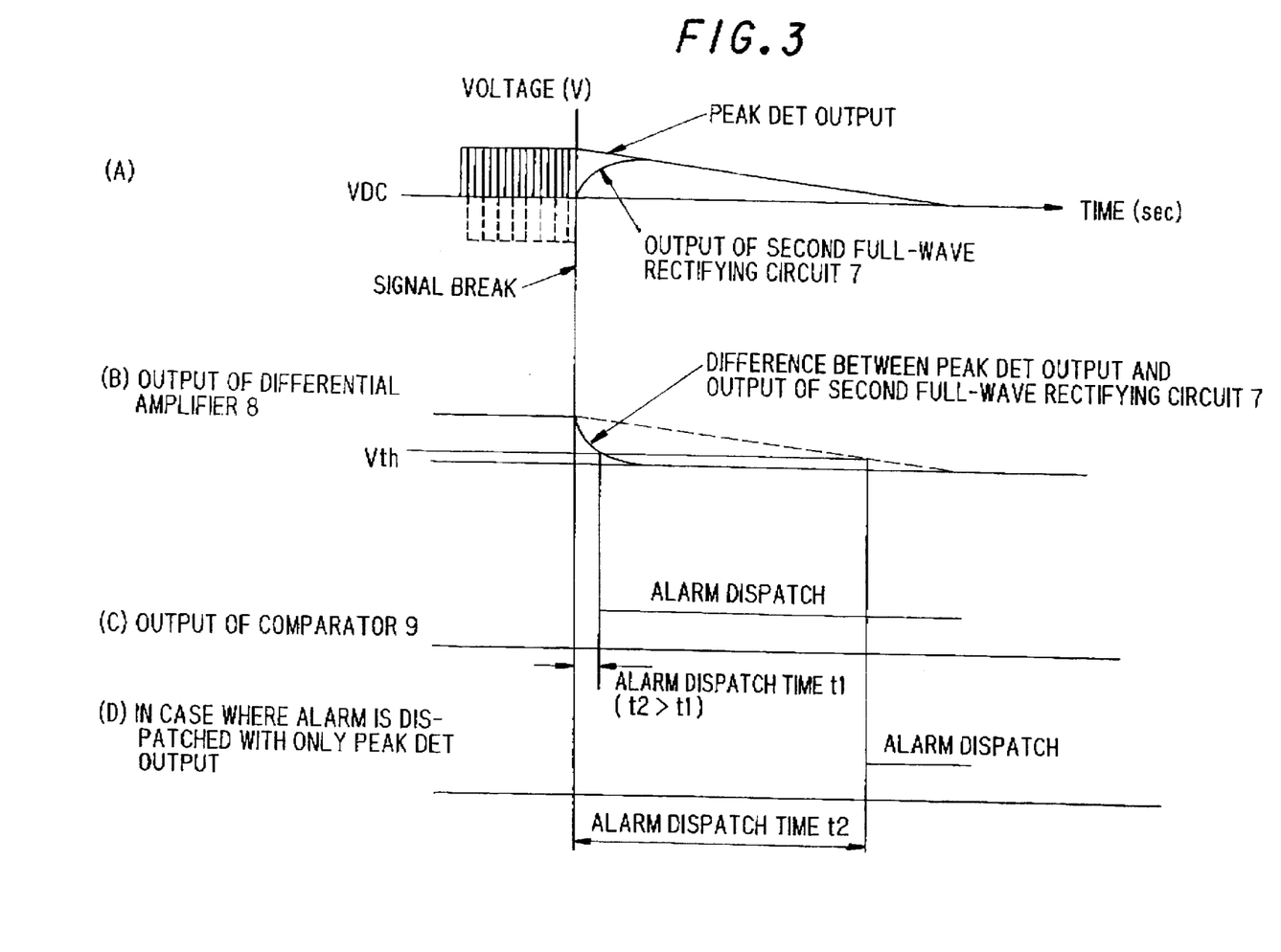
FIG. 3 is a timing chart showing an operation of the first embodiment.

Next, an operation of the first embodiment will be described with reference to FIGS. 2, 3. FIGS. 2, 3 are timing charts indicating an operation of the first embodiment. Referring to FIG. 2(A), data signal, which is output of the limiter amplifier 2, has an amplitude from low level VL to high level VH around the offset voltage given by the DC feedback circuit 3. When there is data signal, the output of the average value detecting circuit 6 is of the same voltage as VDC. However, if the data signal breaks at a low level VL, the voltage approaches the low level VL gradually following a time constant of the average value detecting circuit 6 and after that, converges to a level VDC according to any smaller time constant of a time constant of the DC feedback circuit 3 and a time constant of AC coupling with the coupling capacitor 1 (see Ave DET output 51 of the same FIG. (A)).

At this time, the time constant of the average value detecting circuit 6 needs to be slower than the specified same sign continuity and further faster than any smaller time constant of the time constant of the DC feedback circuit 3 and the time constant of AC coupling with the coupling capacitor 1.

If the data signal breaks at a high level VH, the voltage approaches the high level VH gradually according to the time constant of the average value detecting circuit 6. After that, the voltage converges to the level VDC according to any small time constant of the time constant of the DC feedback circuit 3 and the time constant of AC coupling with the coupling capacitor 1 (see output 52 of the same FIG. (A)).

By passing the output of the average value detecting circuit 6 through the second full-wave rectifying circuit 7, the signal can be outputted to the same positive level side as the output of the peak value detecting circuit 5 as shown in FIG. 3(A), regardless of which a level just before a break of the data signal in of positive level or negative level.

On the other hand, because the data signal passes the first full-wave rectifying circuit 4 as shown in FIG. 2(B), the amplitude of a low level VL side is folded back to a high level VH side, so that the output of the peak value detecting circuit 5 when there is data signal becomes high level VH.

Then, when the data signal breaks, the output of the peak value detecting circuit 5 converges to level VDC according to any smaller time constant of the time constant of the DC feedback circuit 3 and the time constant of AC coupling with the coupling capacitor 1 regardless of which a level just before the break of the data signal is of positive level or negative level.

At this time, the discharge time constant of the peak value detecting circuit 5 needs to be faster than any smaller time constant of the time constant of the DC feedback circuit 3 and the time constant of AC coupling with the coupling capacitor 1.

Consequently, the peak value detecting circuit 5 detects an envelope of the first full-wave rectifying circuit 4 and when the data signal breaks, the voltage converges to level VDC according to any smaller time constant of the time constant of the DC feedback circuit 3 and the time constant of AC coupling with the coupling capacitor 1.

Although when there is data signal as shown in FIG. 3(A), a difference between the output of the peak value detecting circuit 5 and the output of the second full-wave rectifying circuit 7 is (VH–VDC) V, that difference begins to be reduced after the data signal breaks, and soon both the outputs becomes equal, so that the voltage converges to level VDC according to any smaller time constant of the time constant of the DC feedback circuit 3 and the time constant of AC coupling with the coupling capacitor 1.

The difference between the output of the peak value detecting circuit 5 and the output of the second full-wave rectifying circuit 7 is amplified with the differential amplifier 8 and if this difference drops below the reference voltage Vth, the comparator dispatches an alarm (see FIGS. 3(B), (C)).

In FIG. 3(A), although the output of the peak value detecting circuit 5 and the output of the second full-wave rectifying circuit 7 exist on the high level VH side, it is permissible that they exist on the low level VL side. Depending on which is selected an inverted input terminal or non-inverted input terminal of the differential amplifier 8, a differential curve between the output of the peak value detecting circuit 5 and the output of the second full-wave rectifying circuit 7 shown in FIG. 3 (B) is inverted from positive level to negative level. In this case, a difference between the output of the peak value detecting circuit 5 and the output of the second full-wave rectifying circuit 7 is amplified with the differential amplifier 8 and if this difference increases over the reference voltage vth, the comparator 9 dispatches an alarm.

On the other hand, FIG. 3(D) shows a timing chart of conventional art in which data signal break is detected by detecting that a peak value of reception signal drops to a predetermined value. If comparing FIG. 3 (C) with FIG. 3 (D), it is apparent that according to the present invention (see FIG. 3 (C)) time required for detecting data signal can be reduced with respect to the conventional case.

Figure 4:
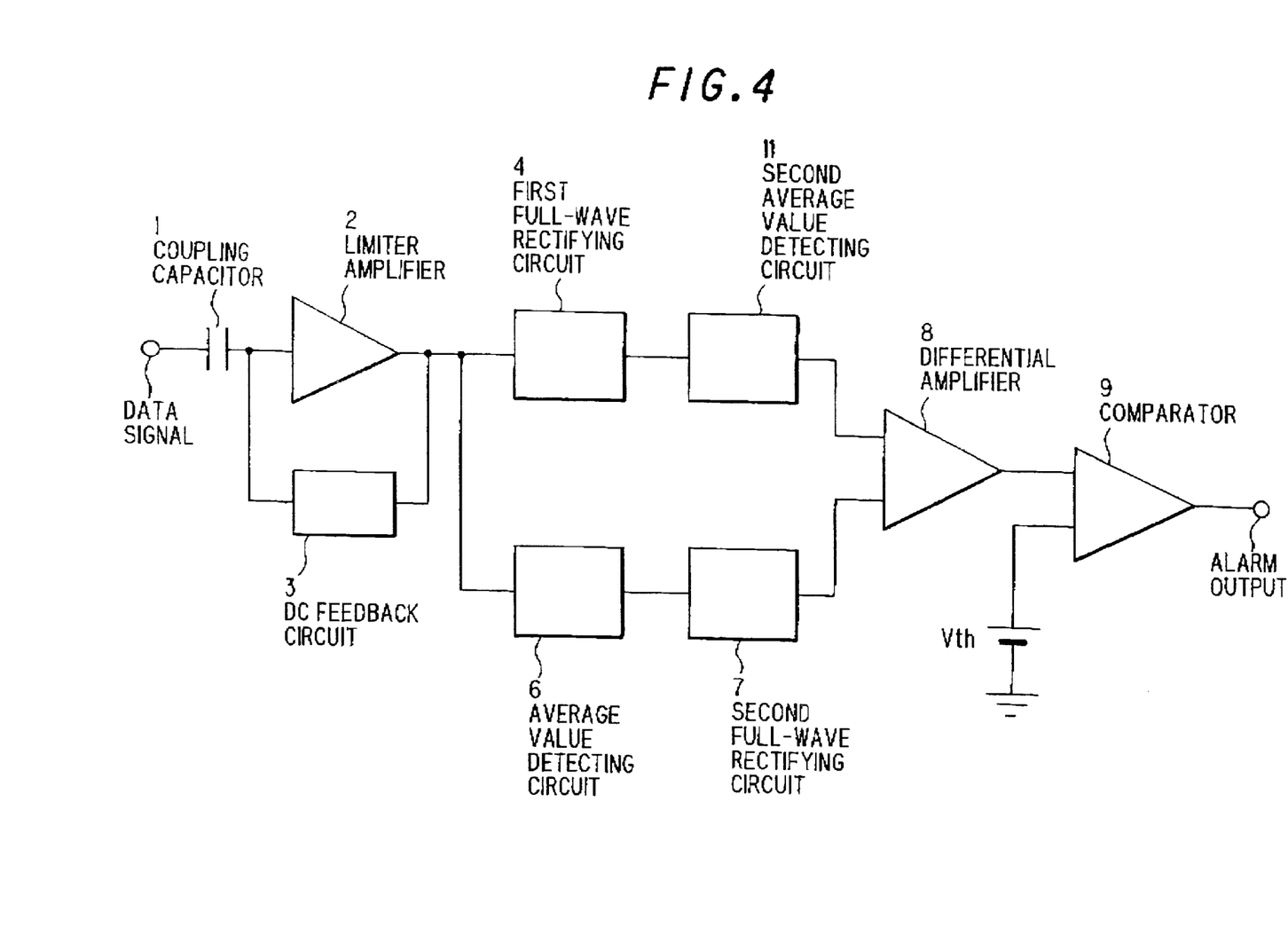
FIG. 4 is a structure diagram of a second embodiment.
Figure 5:
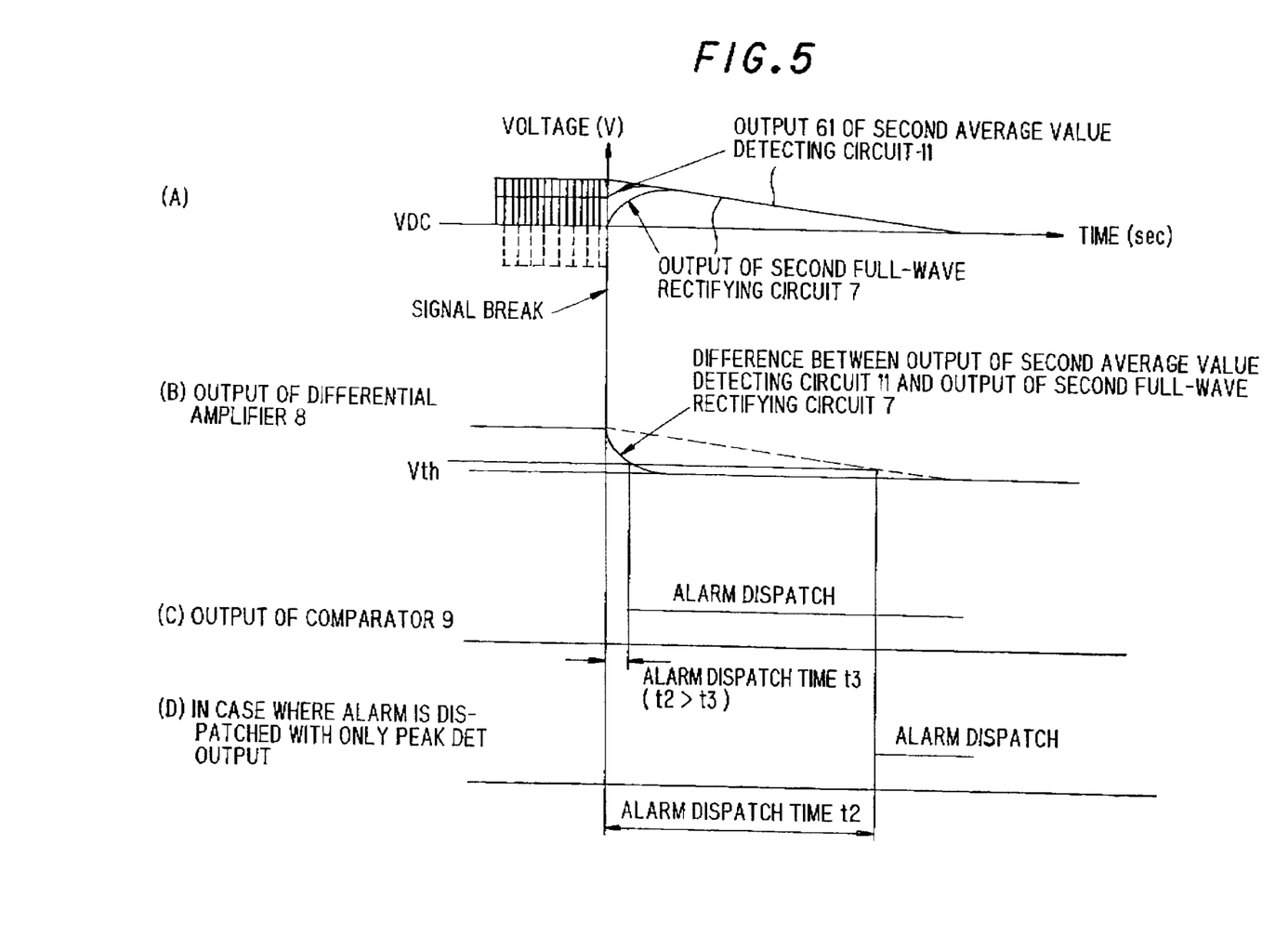
FIG. 5 is a timing chart showing an operation of the second embodiment.

Next, the second embodiment of the present invention will be described. FIG. 4 shows a structure diagram of the second embodiment and FIG. 5 is a timing chart indicating an operation of the second embodiment. Meanwhile, in FIG. 4, like reference numerals are attached to the same components as FIG. 1 and a description thereof is omitted. Referring to FIG. 4, the feature of the signal break detecting circuit of the second embodiment is that a second average value detecting circuit (Ave DET2) 11 is employed instead of the peak value detecting circuit 5 of the first embodiment.

Referring to FIG. 5 (A), because data signal is full-wave rectified by the first full-wave rectifying circuit 4 in FIG. 5(A), if there is data signal, output of the second average value detecting circuit 11 is in the vicinity of the high level VH or slightly lower than the high level VH (however, higher than the level VDC) Then, when the data signal breaks, that voltage approaches the high level VH gradually according to the time constant of the second average value detecting circuit 11 irrespective of which the level just before the data signal breaks of positive level or negative level. After that, it converges to the level VDC according to any smaller time constant of the time constant of the DC feedback circuit 3 and the time constant of AC coupling with the coupling capacitor 1 (see output 61 of FIG. 5(A)).

As compared to the first embodiment, although when there is data signal the difference in output between the second average value detecting circuit 11 and the second full-wave rectifying circuit 7 is reduced, a detecting circuit which does not need so high speed operation as the peak value detecting circuit can be achieved with the average value detecting circuit 11 (see FIGS. 5(B), (C)). On the other hand, FIG. 5(D) shows a timing chart of the conventional art in which the data signal break is detected by detecting that the peak value of reception signal drops to a predetermined value.

Figure 6:
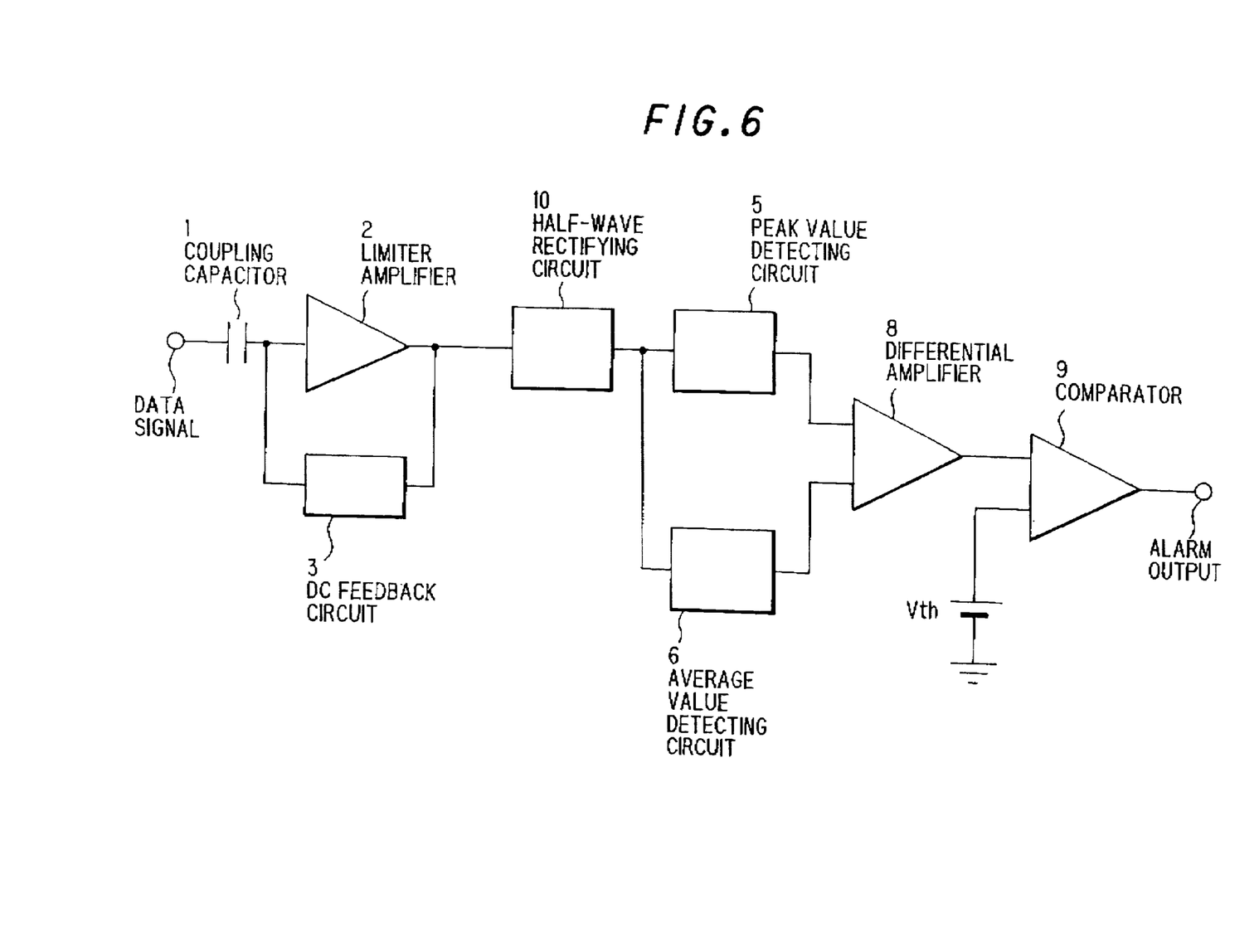
FIG. 6 is a structure diagram of a third embodiment.
Figure 7:
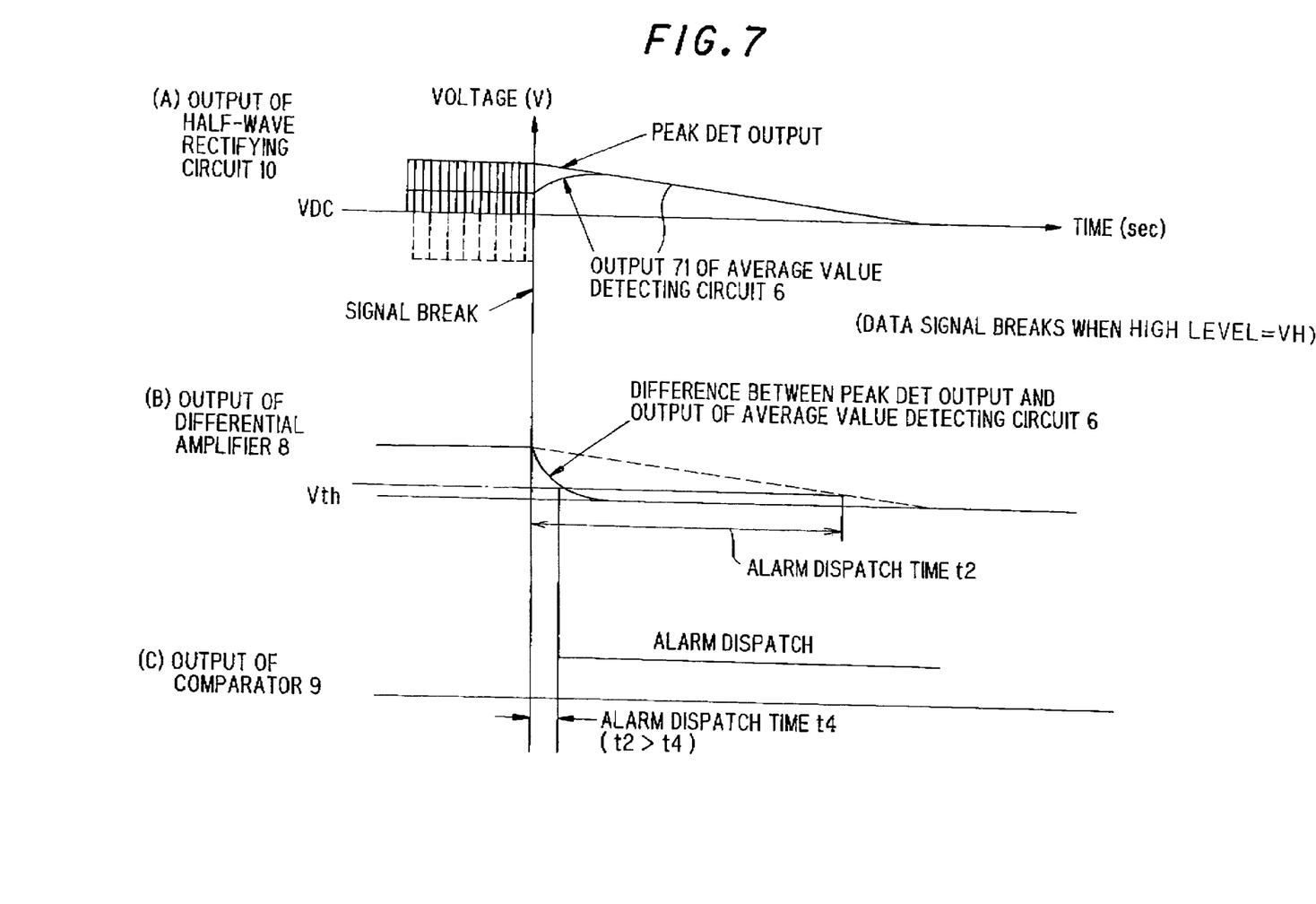
FIG. 7 is a timing chart showing an operation of the third embodiment.
Figure 8:
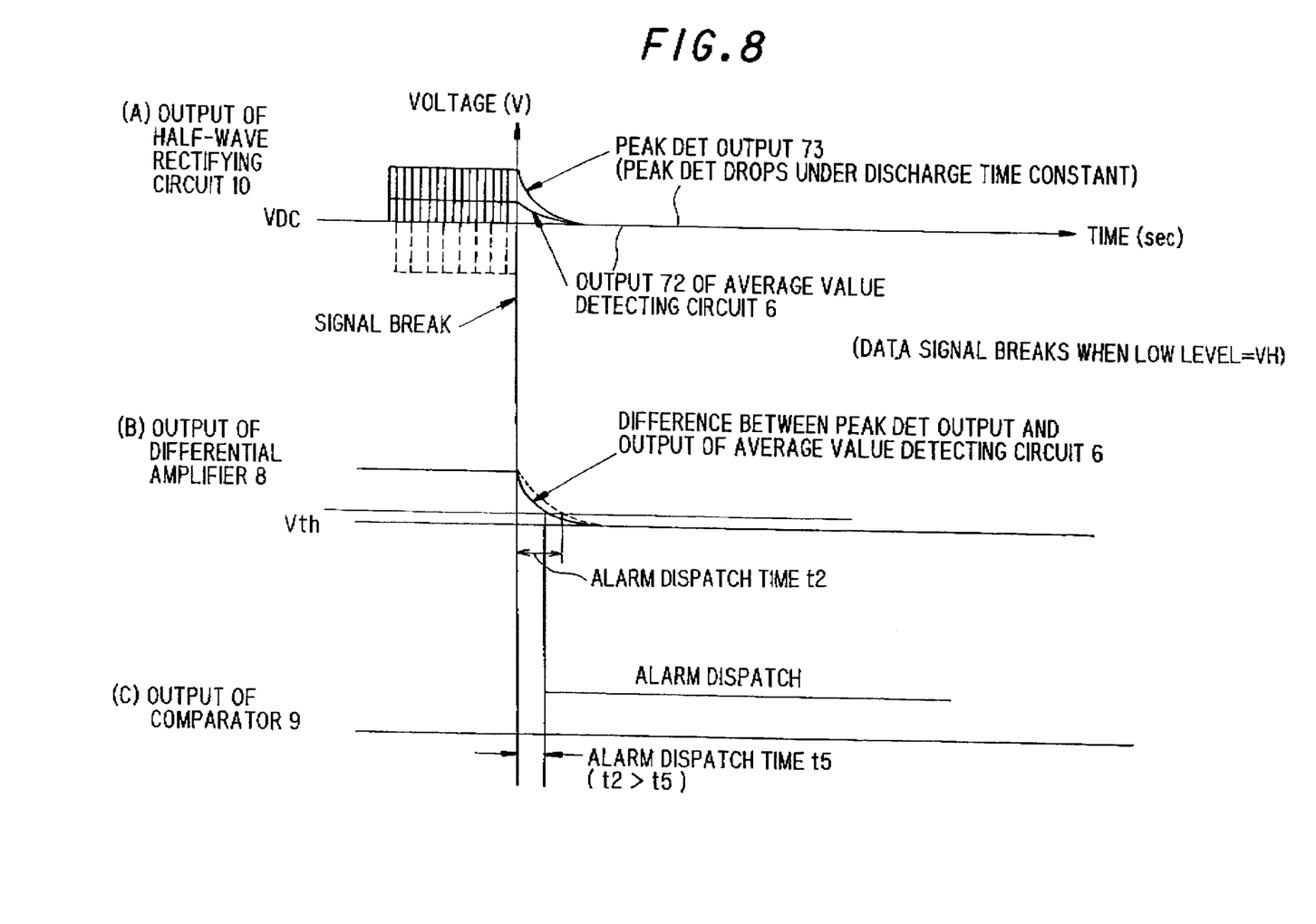
FIG. 8 is a timing chart showing an operation of the third embodiment.

Next, a third embodiment of the present invention will be described. FIG. 6 shows a structure diagram of the third embodiment and FIGS. 7, 8 are timing charts showing an operation of the third embodiment. Meanwhile, in FIG. 6, like reference numerals are attached to the same components as FIG. 1 and a description thereof is omitted. Referring to FIG. 6, the feature of the third embodiment is that the signal break detecting circuit of the third embodiment is so constructed that after the data signal is half-wave rectified with the first half-wave rectifying circuit 10, it is inputted to the peak value detecting circuit 5 and the average value detecting circuit 6 and that the single half-wave rectifying circuit 10 can do the same work which the two full-wave rectifying circuits 4, 7 do.

Referring to FIG. 7(A), the output of the average value detecting circuit 6 when there is data signal becomes an intermediate voltage between the level VDC and the high level VH. Then, when the level just before the data signal breaks is of high level VH, the voltage approaches the high level VH gradually according to the time constant of the average value detecting circuit 6 like the first embodiment. After that, it converges to the level VDC according to any smaller time constant of the time constant of the DC feedback circuit 3 and the time constant of AC coupling with the coupling capacitor 1 (see output 71 of FIG. 7(A)).

Meanwhile, FIG. 7(B) shows the relation between the difference in the output between the peak value detecting circuit 5 and the average value detecting circuit 6 and the reference voltage Vth. FIG. 7(C) shows an alarm dispatch timing.

On the other hand, when the level just before the data signal breaks is of low level VL, the output of the average value detecting circuit 6 converges to the level VDC according to the time constant of the average value detecting circuit 6 (see output 72 of FIG. 8(A)). The output of the peak value detecting circuit 5 converges to the level VDC according to discharge time constant of the peak value detecting circuit 5 (see output 73 of FIG. 8(A)). In this case, output 72 of the average value detecting circuit 6 and output 73 of the peak value detecting circuit 5 in FIG. 8(A) converge to the level VDC in a shorter time as compared to the output waveform of FIG. 7(A).

FIG. 8(B) shows the relation between the difference in output between the peak value detecting circuit 5 and the average value detecting circuit 6 and the reference voltage Vth and FIG. 8(C) shows an alarm dispatch timing.

The present invention achieves a signal break detecting circuit for detecting a signal break in reception signal, comprising: a first value detecting means for detecting a first value obtained corresponding to the amplitude of the reception signal; a second value detecting means for detecting a second value which is obtained corresponding to the amplitude of the reception signal and different from the first value; a difference detecting means for detecting a difference between the first value and the second value; and a comparing means which compares output of the difference detecting means with a predetermined reference value and outputs a comparison result. Consequently, time necessary for detecting data signal break can be reduced.

Specifically, as the first effect, alarm dispatch time (response speed) can be controlled according to the time constant of the average value detecting circuit without depending on any smaller time constant of the time constant of the DC feedback circuit 3 and the time constant of AC coupling of the coupling capacitor 1. Consequently, the alarm dispatch time can be quickened as compared to when alarm is dispatched with only output of the peak value detecting circuit 5.

The second effect is that by monitoring a difference between the average value of data signal and full-wave rectified peak value, signal level can be detected in a short time regardless of offset of the data signal. Particularly, the present invention is effective if there is offset in a limiter amplifier or the like and further, also effective in a case of optimizing the threshold by providing the limiter amplifier with offset intentionally for adaptive threshold control (ATC).

The third effect is that due to the full-wave rectification, the alarm can be dispatched regardless of a level just before data signal breaks.

The fourth effect is that power consumption can be reduced because such a high speed circuit as a flip-flop circuit and logic IC is not employed.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A signal break detecting circuit for detecting a signal break in reception signal, comprising:

a first value detecting means for detecting a first value obtained corresponding to the amplitude of said reception signal;

a second value detecting means for detecting a second value which is obtained corresponding to the amplitude of said reception signal and different from said first value;

a difference detecting means for detecting a difference between said first value and said second value; and a comparing means which compares output of said difference detecting means with a predetermined reference value and outputs a comparison result.

2. A signal break detecting circuit as claimed in claim 1 wherein as the comparison result of said comparing means, an alarm for notifying the signal break in said reception signal is dispatched.

3. A signal break detecting circuit as claimed in claim 1 wherein said first value comprises a peak value while said second value comprises an average value.

4. A signal break detecting circuit as claimed in claim 1 wherein said first value comprises an average value of signals obtained by rectifying said reception signals while said second value comprises an average value.

5. A signal break detecting circuit as claimed in claim 1 further comprising a half-wave rectifying means for half-wave rectifying said reception signal, wherein said first value detecting means detects a first value obtained corresponding to the amplitude of a signal half-wave rectified by said half-wave rectifying means while said second value detecting means detects a second value obtained corresponding to the amplitude of a signal half-wave rectified by said half-wave rectifying means.

6. A signal break detecting circuit as claimed in claim 5 wherein said first value is a peak value of said half-wave rectified signal while said second value is an average value of said half-wave rectified signal.

7. A signal break detecting circuit as claimed in claim 3 wherein said first value detecting means comprises a first full-wave rectifying circuit for full-wave rectifying said reception signal and a peak value detecting circuit for detecting a peak value in a signal full-wave rectified by said first full-wave rectifying circuit.

8. A signal break detecting circuit as claimed in claim 4 wherein said first value detecting means comprises a first full-wave rectifying circuit for full-wave rectifying said reception signal and a second average value detecting circuit for detecting an average value of a signal full-wave rectified by said full-wave rectifying circuit.

9. A signal break detecting circuit as claimed in claim 7 wherein said second value detecting means comprises an average value detecting circuit for detecting an average value of said reception signal and a second full-wave rectifying circuit for full-wave rectifying an output signal of said average value detecting circuit.

10. A signal break detecting circuit as claimed in claim 1 wherein said reception signal is obtained through an amplifying means having a capacitative element and a DC feedback circuit.

11. A signal break detecting circuit as claimed in claim 10 wherein said amplifying means amplifies an input signal to predetermined amplitude.

12. A signal break detecting circuit as claimed in claim 1 wherein said reception signal comprises a data signal which is transformed from an optical signal to an electric signal.

13. An optical receiving unit containing said signal break detecting circuit according to claim 1.

14. A signal break detecting circuit as claimed in claim 2 wherein said first value comprises a peak value while said second value comprises an average value.

15. A signal break detecting circuit as claimed in claim 2 wherein said first value comprises an average value of signals obtained by rectifying said reception signals while said second value comprises an average value.

16. A signal break detecting circuit as claimed in claim 2 further comprising a half-wave rectifying means for half-wave rectifying said reception signal, wherein said first value detecting means detects a first value obtained corresponding to the amplitude of a signal half-wave rectified by said half-wave rectifying means while said second value detecting means detects a second value obtained corresponding to the amplitude of a signal half-wave rectified by said half-wave rectifying means.

17. A signal break detecting circuit as claimed in claim 8 wherein said second value detecting means comprises an average value detecting circuit for detecting an average value of said reception signal and a second full-wave rectifying circuit for full-wave rectifying an output signal of said average value detecting circuit.

18. A signal break detecting circuit as claimed in claim 2 wherein said reception signal is obtained through an amplifying means having a capacitative element and a DC feedback circuit.

19. A signal break detecting circuit as claimed in claim 2 wherein said reception signal comprises a data signal which is transformed from an optical signal to an electric signal.

20. An optical receiving unit containing said signal break detecting circuit according to claim 2.

21. The circuit of claim 1, wherein said second value comprises an average of the amplitude of the reception signal.

22. A signal break detecting circuit for detecting a signal break in a reception signal, comprising:

a first value detector that detects a first value based upon an amplitude of said reception signal;

a second value detector that detects a second value based upon the amplitude of said reception signal and different from said first value;

a difference detector that detects a difference between said first value said second value; and a comparator that compares said difference with a predetermined reference value and outputs a comparison result.

* * * * *